Figure 1:
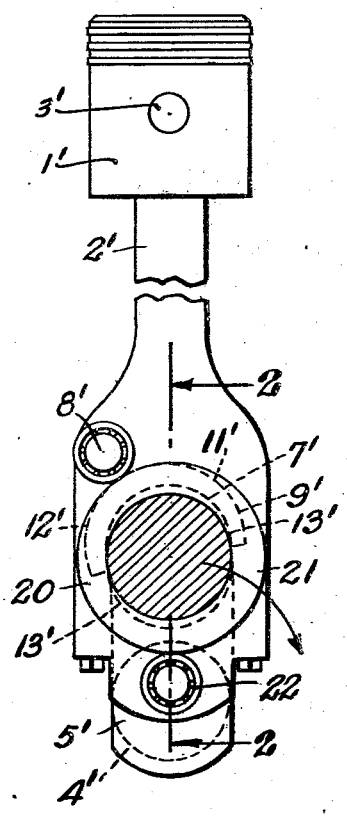

Oct. 1, 1946.                      J. D. BELL                        2,408,546

MECHANICAL MOVEMENT

Filed April 26, 1943

INVENTOR,

Joseph D. Bell

Patented Oct. 1, 1946

2,408,546

UNITED STATES PATENT OFFICE 2,408,546

MECHANICAL MOVEMENT

Joseph D. Bell, San Francisco, Calif.

Application April 26, 1943, Serial No. 484,646

6 Claims. (Cl. 74—44)

The present invention relates to improvements in engines, and its principal object is to provide improved means for transmitting motion from a reciprocating piston to a rotary shaft. The present application is a continuation in part of my co-pending application, Serial Number 434,094, and introduces certain additional features tending to improve the operation of my invention.

The principal object of my invention is to introduce the principle of the wedge drive into the transmission whereby the latter is rendered much more efficient than the conventional connecting rod drive.

The wedge drive has been employed since time immemorial for the lifting of heavy loads, and for transmitting power to perform heavy work, and I have found through considerable experimentation that the wedge principle may be successfully employed in transmitting rotary movement to a crank shaft from a reciprocating piston at a great saving in power.

It is well known that in the conventional connecting rod drive a great deal of power is lost near the dead center points, and that the drive does not really become efficient until after the crank pin has passed the top dead center point by a considerable distance, while on the other hand, the efficiency becomes very low as the crank pin approaches bottom dead center.

In my present invention it is proposed to use a wedge drive, particularly in the top dead center region whereby the power transmission is rendered very efficient, and it is further proposed to arrange the wedge drive in such a manner that it works on the crank pin at a favorable leverage, which results in a corresponding increase in power.

I have found by practical experiments that to lift a ten-pound weight by means of the conventional connecting rod drive, with the weight suspended from a pulley equal in radius to the length of the crank arm, it takes slightly above ten pounds to lift the weight when the force is applied with the crank arm in the most favorable position, that is, at right angles to the direction of force applied, while from that point in both directions, the force necessary to lift the weight rapidly increases to twenty or thirty pounds.

In my invention, under the same conditions, I have found that the force necessary to lift the ten-pound weight averages below ten pounds throughout, and in fact, becomes quite low near the dead centers, with the result that a relatively small force will transmit a comparatively great amount of power.

I might say that my engine is intended particularly to be of the slow speed type, while of course, the principles involved may be developed to apply to high speed engines.

Since the wedge drive is best adapted for wedging the crank pin past dead center, while the conventional piston rod drive operates best after the crank arm has turned from dead center through a considerable angle, I propose to utilize both drives, each at the point of its greatest efficiency, and to provide means whereby the drive is shifted from the wedge to the conventional piston rod drive at a desired angle, and whereby the shifting from one drive to the other takes place smoothly and without any sudden break in the movement.

And finally, it is proposed to provide a cooperating means tending to overcome any tendency at irregularity in motion or so-called slap that might be inherent in the structure due to the double drive on the crank pin.

Further objects and advantages of my invention will appear as the specification progresses, and the novel features of the same will be particularly defined in the claims hereto attached.

The preferred forms of my invention are illustrated in the accompanying drawing, forming part of this application, in which:

Figure 1 shows a transverse sectional view through my engine drive.

Figure 2:
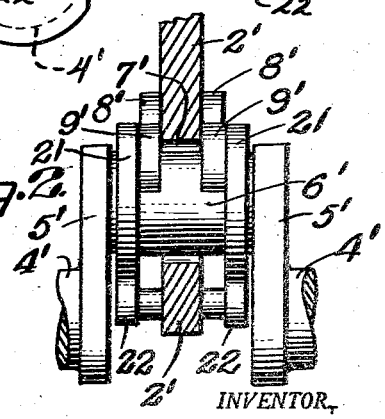

Figure 2, a section taken along line 2—2 of Figure 1.

Figure 3:
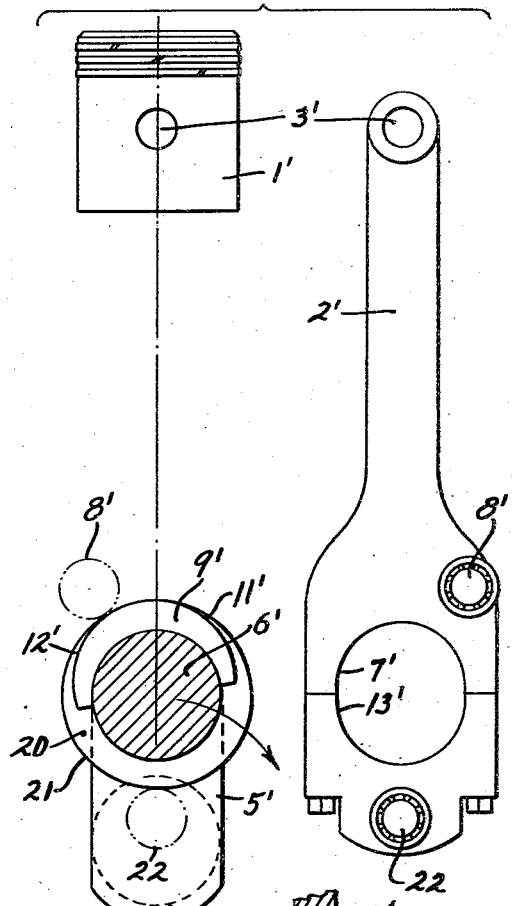
Figure 4:
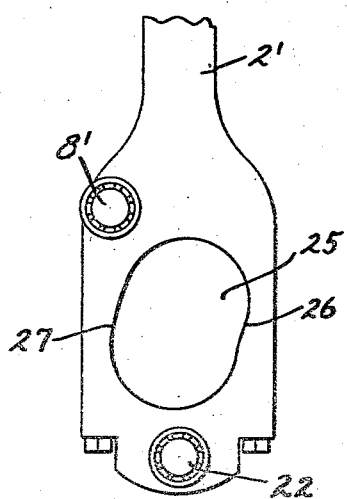

Figure 3, a view of the same form showing the connecting rod separate from the crank pin; and Figure 4, a fragmentary view of a slightly modified form of connecting rod.

While I have shown only the preferred form of my invention, I wish to have it understood that various changes or modifications may be made within the scope of the claims hereto attached without departing from the spirit of the invention.

Referring to the drawing in detail the piston rod 2' is connected to the piston 1' by means of the pin 3' and the crank shaft 4' has the crank arms 5' and the crank pin 6' supported therein. The crank is intended for rotation in clockwise direction, as indicated by the arrows.

The piston rod is formed with a slot 7' engaging over the crank pin, with freedom of sliding movement, the slot being relatively short as compared with the diameter of the crank pin.

Wedging members 8' are shown in the form of rollers mounted on opposite sides of the piston rod, somewhat to the rear of its centerline, and wedging members 9' are shown in the form of eccentric cams secured upon the crank pin in the planes of the rollers for cooperation therewith. The eccentrics are preferably positioned with their major axes leaning backward with respect to the centerline of the drive when the crank pin is in dead center position. Since only the main projecting portion of each cam performs a function, the opposite portion, which would substantially run into the outline of the crank pin, has been omitted as shown at 20.

The parts thus far described function substantially as follows: At the beginning of the downward stroke, the rollers 8' bearing on the eccentrics 9' wedge the crank pin past dead center in the direction shown in Figure 1, and, after the crank has reached a desired angle, the upper wall of slot 7' bears down on the crank pin to continue the drive.

During the wedge drive, the slot 7' of the piston rod on the side marked by numeral 13' holds the wedging member 8' in driving relation with cam 9', until the upper wall of slot 7' takes over the driving push. Just as the upper wall of the slot has taken over the said drive, the wedging member 8'—9' lose contact, but they are reengaged as the crank pin again approaches top dead center, and they lift the piston rod back into its initial position.

It appears desirable to provide means for controlling relative movement between the piston and crank pin outside of such movement as is inherent in the desired drive, and to confine both piston and crank pin to such co-related movement as may be found by experience to develop maximum efficiency.

To accomplish this I provide a pair of cooperating guide members on the piston and the crank pin (on each side of the piston) in the form of a cam 21 and a roller 22. The cam 21 is fixed to the crank pin and may be substantially concentric with the latter, so that at the maximum projection of the cam 9' it is substantially flush therewith, while diametrically opposite it presents a relative wide margin beyond the cam 9' even if the latter were continued clear around. The relationship between the cams is most easily understood by reference to Figure 3, which shows the crank pin assembly by itself.

The rollers 22 are mounted on the piston rod, in cooperative relation to the cams 21, preferably at the bottom and on the centerline, or possibly diametrically opposite the rollers 8'.

It will be noted that rollers 22 are always in contact with the faces of cams 21 at some point, while at the same time, on the opposite side of the center of cams 9', either the upper wall of slot 7' is engaged with the crank pin, or rollers 8' are engaged with cams 9'. In either case, there is sufficient engagement, either between the three walls of the slot 7', the rollers 22 and cams 21, or between two walls of the slot 7', the rollers 22 and cams 21, combined with rollers 8' in engagement with cams 9', to prevent objectionable slap at all times.

The cam 21 is here shown as being circular in form, but that is not necessarily the most desirable shape. In fact, the cam would probably be slightly out of round or oblong, depending somewhat upon the amount of travel of the crank pin in the slot 7'. The exact form would best be found experimentally, by tracing the desired course of the cam against the roller.

If it should be desired to confine the action of the cam and the roller to coordination of the crank pin and piston rod movement during the suction stroke only, a selected portion of the cam would be sufficient for this limited purpose.

In Figure 4 is shown a modified form of slot 25 for the piston rod 2', the slot being slightly kidney-shaped, that is, with a slight dent 26 in one side and a slight corresponding bulge 27 in the other side, and the slot is shown as being slightly tilted with respect to the centerline of the piston rod. This will offer a certain advantage on the downstroke as tending to reduce friction during the wedging action.

I claim:

1. In a power transmitting device, a rotary member having a crank therein, a reciprocating member having a connecting rod pivoted thereto, cooperative wedge members on the crank and the rod for transmitting motion from the rod to the crank, and cooperative members on the rod and the crank for controlling lengthwise movement with respect to the cam.

2. In a power transmitting device, a rotary member having a crank therein, a reciprocating member having a connecting rod pivoted thereto, cooperative wedge members on the rod and the crank for rotating the crank when the reciprocating member moves toward the rotary member, means for maintaining the wedge members in driving relation during the wedging action, and cooperative members on the crank and the rod for controlling lengthwise movement of the rod with respect to the crank.

3. In a power transmitting device, a rotary member having a crank therein, a reciprocating member having a connecting rod pivoted thereto, cooperative wedge members on the rod and the crank for rotating the crank when the reciprocating member moves toward the rotary member, means for maintaining the wedge members in driving relation during the wedging action, and cooperative members on the crank and the rod for controlling lengthwise movement of the rod with respect to the crank, the latter means comprising a cam on the crank and a cooperating contact member on the rod.

4. In a power transmitting device, a rotary member having a crank therein and having two cams of different shapes on the crank, a reciprocating member having a connecting rod pivoted thereto, means including a sliding connection and engaging one of the cams for transmitting movement from the rod to the crank and a member on the rod bearing on the second cam for controlling the extent of the sliding movement.

5. In a power transmitting device, a rotary member having a crank therein, a reciprocating member having a connecting rod pivoted thereto, means including a sliding connection for transmitting movement from the rod to the crank and cooperative means on the crank and the rod for controlling the extent of the sliding movement, the latter means comprising a cam on the crank and a cooperative contact member on the rod.

6. In a power transmitting device, a rotary member having a crank therein, a reciprocating member having a connecting rod pivoted thereto, the rod having a lengthwise slot engaging over the crank and slidable thereon, cooperative wedge members on the rod and the crank for transmitting motion from one to the other, a cam on the crank and a contact member on the rod cooperating with the cam in controlling the extent of the sliding movement.

JOSEPH D. BELL.